United States Patent
Wadsworth et al.

(10) Patent No.: US 8,968,617 B2
(45) Date of Patent: Mar. 3, 2015

(54) THERMO-RHEOLOGICAL FLUID VALVE FOR RESIN INFUSION

(71) Applicant: Spirit AeroSystems, Inc., Wichita, KS (US)

(72) Inventors: Mark A. Wadsworth, Sedan, KS (US); Adrienne M. Strohmeyer, Wichita, KS (US); Khai Nguyen, Wichita, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 226 days.

(21) Appl. No.: 13/674,679

(22) Filed: Nov. 12, 2012

(65) Prior Publication Data
US 2014/0131916 A1 May 15, 2014

(51) Int. Cl.
 B29C 70/44 (2006.01)
 B29C 35/02 (2006.01)
 B29C 35/16 (2006.01)

(52) U.S. Cl.
 CPC ........... *B29C 70/443* (2013.01); *B29C 35/02* (2013.01); *B29C 2035/1616* (2013.01); *B29C 2035/1658* (2013.01)
 USPC ........................... 264/258; 264/137; 425/544

(58) Field of Classification Search
 USPC .................................................. 264/258, 137
 See application file for complete search history.

(56) References Cited

U.S. PATENT DOCUMENTS

| | | | | |
|---|---|---|---|---|
| 4,082,109 A | * | 4/1978 | Sun et al. | 137/340 |
| 4,203,472 A | | 5/1980 | Dulaney | |
| 4,740,346 A | * | 4/1988 | Freeman | 264/258 |
| 5,241,991 A | | 9/1993 | Iorio et al. | |
| 5,885,504 A | * | 3/1999 | David et al. | 264/257 |
| 5,988,197 A | * | 11/1999 | Colin et al. | 137/13 |
| 6,238,613 B1 | | 5/2001 | Batchelder et al. | |
| 7,939,011 B2 | | 5/2011 | Young | |
| 2005/0023712 A1 | * | 2/2005 | Backhouse | 264/40.4 |
| 2010/0124654 A1 | | 5/2010 | Smith et al. | |
| 2012/0043704 A1 | | 2/2012 | Hawkins | |

* cited by examiner

*Primary Examiner* — Matthew Daniels
(74) *Attorney, Agent, or Firm* — Hovey Williams LLP

(57) ABSTRACT

A resin flow-controlling apparatus for infusing composite reinforcement material with resin. The resin flow-controlling apparatus may have at least one viscosity valve to speed, slow, allow, or deny resin flow through the viscosity valve to the composite reinforcement material depending on the temperature of the viscosity valve. The viscosity valve may fluidly couple a resin reservoir with an enclosed chamber in which the composite reinforcement material resides. The viscosity valve may be thermally coupled with heating and/or cooling elements selectively variable between at least two different temperatures to affect viscosity of the resin and control resin flow from the resin reservoir into the composite reinforcement material. A vacuum port at an opposite end of the composite reinforcement material from the viscosity valve may fluidly couple with the enclosed chamber and a vacuum source may pull atmosphere and/or resin from the enclosed chamber and/or the resin reservoir.

19 Claims, 10 Drawing Sheets

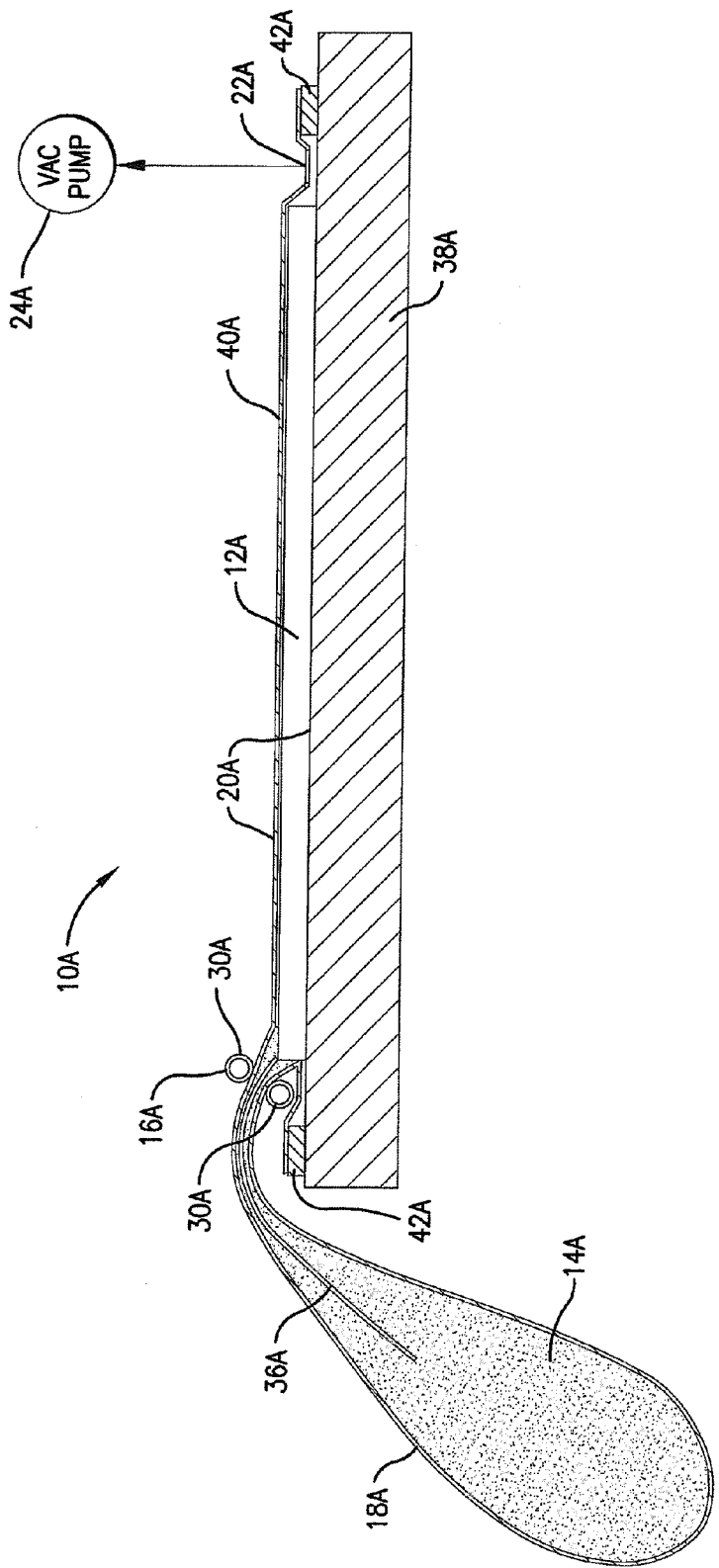

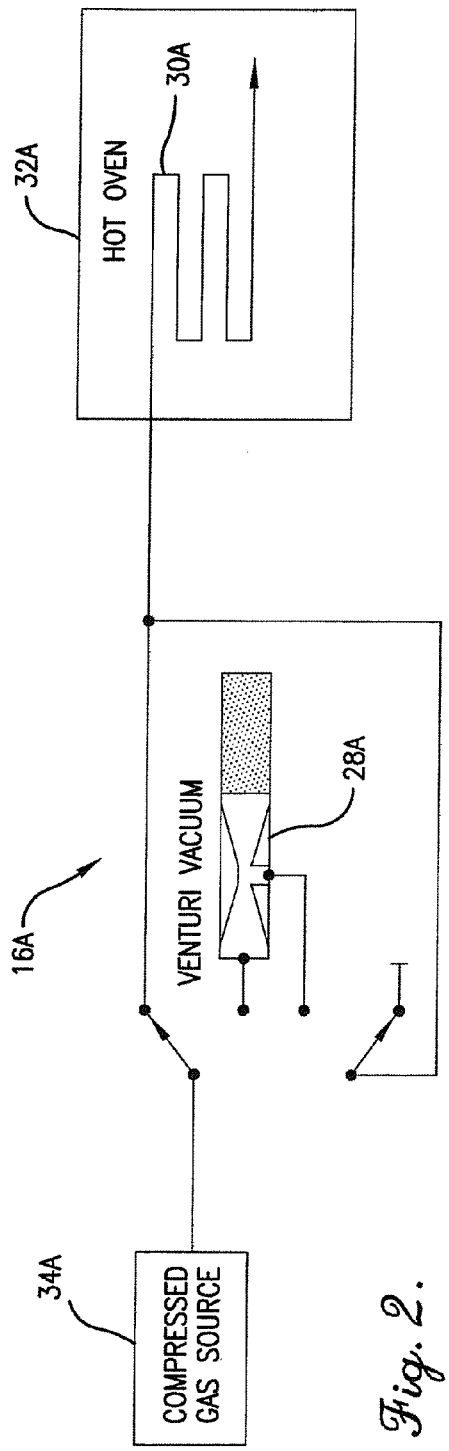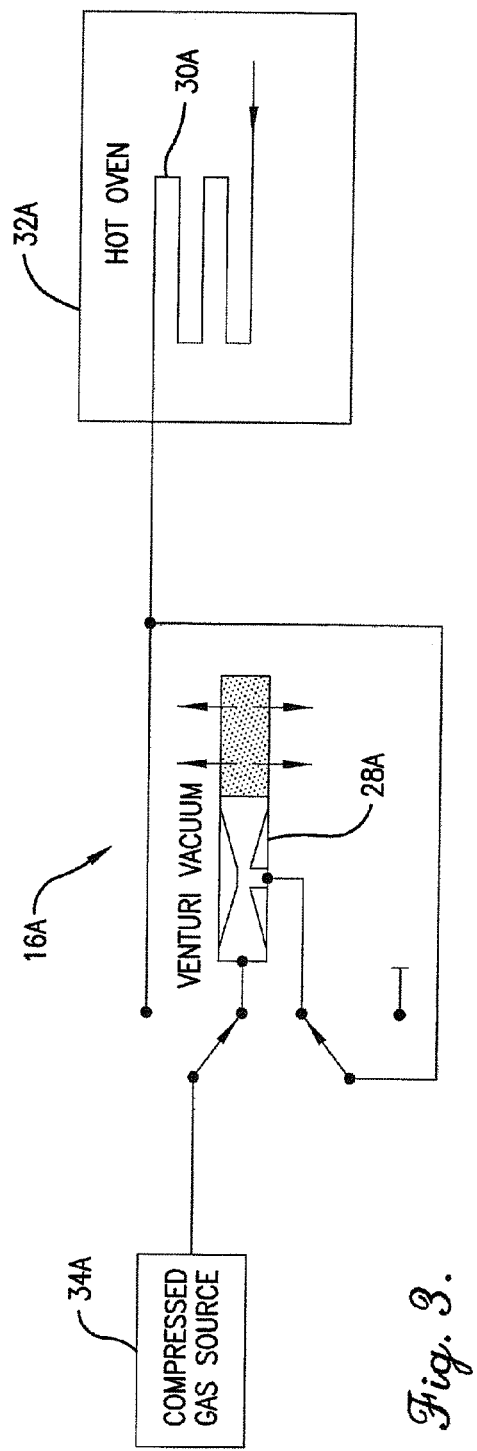

ously flowing resin flow fronts. However, as noted above, such use of tubing and valves is more expensive and complex and also requires multiple openings in the vacuum bag or mold, which could increase the risk of a bag leak. The tubing also frequently requires replacement, due to resin curing in the supply lines.

THERMO-RHEOLOGICAL FLUID VALVE FOR RESIN INFUSION

BACKGROUND

The process of manufacturing composite parts for aircraft may involve infusing a resin such as polyimide into one or more layers or plies of uncured composite reinforcement material. Heat and pressure is then applied to the resin-infused composite reinforcement material to cure and harden it, creating the desired composite part. Tubes, valves, and heat tracing elements are generally required to properly modulate the resin flow to various locations of complex-contoured composite reinforcement material. In particular, for high-temperature cures, resin lines transmitting resin to the composite reinforcement material are heat-traced to prevent the resin from cooling and solidifying in the resin line or tube. This heat-tracing adds to the cost and complexity of the process.

Another method for resin-infusing composite reinforcement material may include pleats, resin pockets, or reservoirs formed into rigid tooling or into a vacuum bag used to isolate and compress the composite reinforcement material during cure. However, the timing of when the resin is released from these pleats, pockets, or reservoirs is not controlled, so as soon as the autoclave or oven is heated to a point where the resin becomes more fluid, the resin simultaneously flows out of the various pockets or reservoirs into the composite reinforcement material. This may be acceptable for a smaller composite part receiving all of its resin from a single reservoir. But a larger part may require multiple reservoirs spaced at incremental locations along the composite reinforcement material so that each portion of the composite reinforcement material has an even amount of resin dispersed therethrough, with different reservoirs configured to saturate different zones of the composite reinforcement material with resin. If all the resin releases into the composite reinforcement material at once, air may be trapped between the multiple resin flow fronts in between adjacent zones. This trapped air may compromise the integrity of the resulting part.

Alternatively, the above-mentioned process using heat-traced tubes can include opening and closing valves to control when and how much resin is applied to different zones of the composite reinforcement material. Controlling and/or sequencing this timing of the resin application can be used to avoid trapping air between simultaneously-flowing resin flow fronts. However, as noted above, such use of tubing and valves is more expensive and complex and also requires multiple openings in the vacuum bag or mold, which could increase the risk of a bag leak. The tubing also frequently requires replacement, due to resin curing in the supply lines.

SUMMARY

Embodiments of the present invention solve the above-mentioned problems and provide a distinct advance in the art of infusing a composite reinforcement material or dry fiber preform with resin. An embodiment of the invention is a resin flow-controlling apparatus for evenly distributing resin throughout a composite reinforcement material to be cured. The resin flow-controlling apparatus may include an enclosed chamber, a resin reservoir, a viscosity valve, and a heat source. The enclosed chamber may contain the composite reinforcement material therein and may have a first and a second opening. The resin reservoir may be fluidly coupled with the first opening and may contain resin therein. The viscosity valve may be located at the first opening and may fluidly couple the resin reservoir with the enclosed chamber. The heat source may selectively heat the viscosity valve to a temperature sufficient to lower a viscosity of the resin such that the resin within the viscosity valve is fluid enough to flow through the viscosity valve from the resin reservoir and through the composite reinforcement material toward the second opening when vacuum is drawn from the second opening. The resin flow-controlling apparatus may also have a cooling source that selectively cools the viscosity valve to a temperature sufficient to raise the viscosity of the resin such that resin the viscosity valve is too thick to flow through the first opening into the enclosed chamber.

A method of infusing composite reinforcement material with resin in accordance with an embodiment of the present invention may include the step of placing the composite reinforcement material within an enclosed chamber. The enclosed chamber may have a first and a second opening. The first opening may be fluidly coupled with a resin reservoir containing resin therein. Furthermore, a viscosity valve may be located between the resin reservoir and the enclosed chamber. The method may further include the steps of forcing the resin from the resin reservoir toward the first opening by drawing vacuum through the second opening and/or pumping resin into the first opening. The method may include a step of heating the viscosity valve to a temperature sufficient to lower a viscosity of the resin such that the resin is fluid enough to flow through the viscosity valve from the resin reservoir and through the composite reinforcement material toward the second opening. The method may also include a step of cooling the viscosity valve to a temperature sufficient to raise the viscosity of the resin such that the resin is too thick to flow past the viscosity valve at the first opening into the enclosed chamber.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein:

FIG. 1 is a vertical cross-sectional view of a resin flow control apparatus constructed in accordance with a first embodiment of the present invention;

FIG. 2 is a schematic view of a viscosity valve of the first embodiment of the resin flow control apparatus in a first, closed position;

FIG. 3 is a schematic view of the viscosity valve of FIG. 2 in a second, open position;

Figure 4:
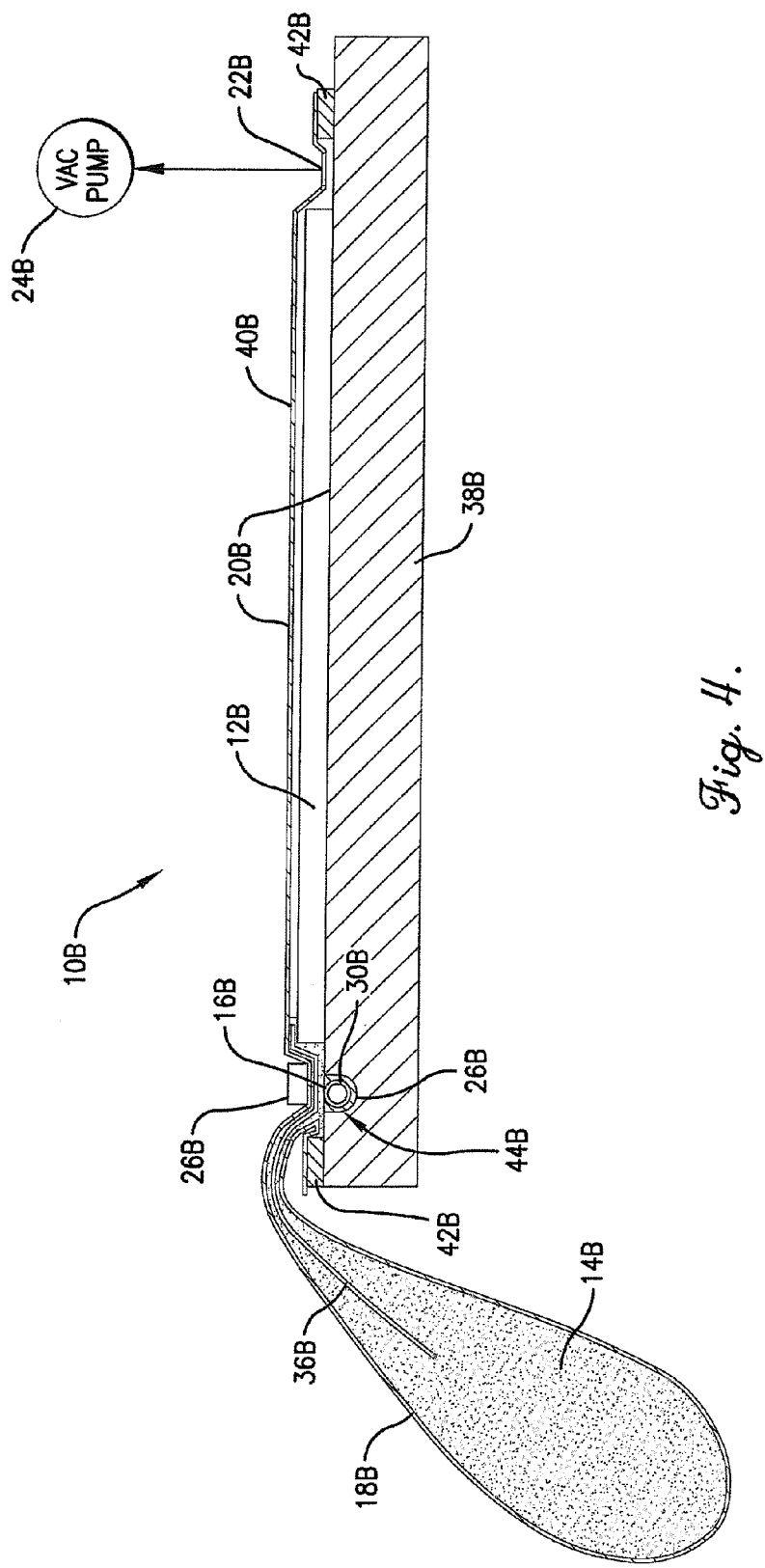
FIG. 4 is a vertical cross-sectional view of a resin flow control apparatus constructed in accordance with a second embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Various embodiments of a resin flow-controlling apparatus are illustrated in FIGS. 1-11, with the same or similar components in the embodiments identified by the same reference numerals followed by a different letter.

Embodiment 1

Pleat, Dual-Sided Viscosity Valve

In a first embodiment of the invention illustrated in FIG. 1, a resin flow-controlling apparatus 10A is configured for infusing composite reinforcement material 12A with resin 14A. The composite reinforcement material 12A may comprise one or more layers or plies of woven or braided fibers of any of a multitude of natural or man-made materials such as fiberglass, carbon, Kevlar®, and the like and may also be referred to as a composite preform. The resin 14A may be a polyimide, an epoxy, a thermoplastic resin, or any other resin known in the art for making composite parts. The resin flow-controlling apparatus 10A may comprise at least one viscosity valve 16A and at least one resin reservoir 18A fluidly coupled with the viscosity valve 16A. The resin flow-control apparatus 10A may further comprise an enclosed chamber 20A, a vacuum port 22A, and/or a vacuum source 24A. The enclosed chamber 20A may be configured for housing therein the composite reinforcement material 12A to be infused with the resin 14A. The resin reservoir 18A, the viscosity valve 16A, the enclosed chamber 20A, the vacuum port 22A, and the vacuum source 24A may all be fluidly coupled with each other such that the vacuum source 24A may pull resin 14A from the resin reservoir 18A and through the composite reinforcement material 12A.

The viscosity valve 16A may be configured to speed, slow, allow, or deny resin flow through the viscosity valve 16A to the composite reinforcement material 12A depending on a temperature of the viscosity valve 16A. The viscosity valve 16A may include a passageway that fluidly couples the resin reservoir 18A with the enclosed chamber 20A in which the composite reinforcement material 12A resides. The viscosity valve 16A may comprise and/or may be thermally coupled with heating and/or cooling elements selectively variable between at least two different temperatures to affect viscosity of the resin 14A, thereby controlling when and how much resin 14A flows from the resin reservoir 18A into the enclosed chamber 20A and/or through the composite reinforcement material 12A.

In some embodiments of the resin flow controlling apparatus 10A the viscosity valve 16A may comprise a venturi vacuum 28A and a coil 30A, as illustrated in FIGS. 2 and 3. The coil 30A is configured to be heated by an oven 32A or autoclave via fluid communication with the venturi vacuum 28A or cooled by direct fluid communication with air from a compressed gas source 34A, which cools the coil 30A. The coil 30A, illustrated in FIGS. 1-3, may be a tube or pipe made of a thermally-conductive material. The viscosity valve 16A may control the flow of resin therethrough by selectively altering the temperature of air flowing through the coil 30A. For example, as illustrated in FIG. 2, the viscosity valve 16A may be switched to a first, close position in which compressed air from the compressed gas source 34A flows directly into the coil 30A, thereby cooling the coil 30A so that resin contacting or located relatively close to the cooled coil 30A would become more viscous and stop flowing through the viscosity valve 16A. However, as illustrated in FIG. 3, the viscosity valve 16A may also be switched to a second, open position in which the compressed air from the compressed gas source 34A is introduced into one port of the venture vacuum 28A while another port of the venturi vacuum 28A is fluidly coupled with the coil 30A which is fluidly coupled with air within the oven 32A or autoclave. In this configuration, the venturi vacuum 28A pulls the air from within the oven 32A or autoclave through the coil 30A in this second, open position so that resin contacting or located relatively close to the heated coil 30A becomes less viscous and may be freely pulled into the enclosed chamber 20A by the vacuum source 24A, as later described herein. Note that in various embodiments of the viscosity valve 16A, the compressed gas source 34A may be replaced with any cooled gas or liquid source, a compressed liquid source, or any apparatus configured for cooling the coil 30A.

The resin reservoir 18A may be a hollow container for resin having one opening. The one opening may be formed or bounded by the viscosity valve 16A and/or may be fluidly coupled with the viscosity valve 16A. The resin reservoir 18A may be fluidly coupled with the enclose chamber 20A via the viscosity valve 16A. In some embodiments of the invention, the resin reservoir 18A may be integrally formed with portions of the viscosity valve 16A and/or the enclosed chamber 20A, as later described herein. The resin reservoir 18A may comprise, for example, a bag pleat, a pocket, a pouch, or any resin reservoir known in the art. In some embodiments of the invention utilizing impermeable membranes or vacuum bags, as later described herein, the resin reservoir 18A may have a flow media 36A extending therein and through the viscosity valve 16A. The flow media 36A may be a thin, porous sheet of material and may be configured to prevent any portion of the resin reservoir 18A and/or the viscosity valve 16A from completely collapsing in or closing off under vacuum or some other pressure, so that both the resin reservoir 18A and the viscosity valve 16A remain fluidly coupled with the enclosed chamber 20A.

The enclosed chamber 20A may comprise a rigid tooling 38A and/or a flexible, impermeable membrane 40A cooperatively forming a hollow chamber in which the composite reinforcement material 12A may reside. For example, the impermeable membrane 40A may be sealed to the rigid tooling 38A with any airtight seal 42A, such as a mechanical seal, sealant tape, or silicone, formed around a periphery of the composite reinforcement material 12A. The enclosed chamber 20A may be fluidly coupled with the vacuum source 24A via the vacuum port 22A and fluidly coupled with the resin reservoir 18A via the viscosity valve 16A. The vacuum port 22A and the viscosity valve 16A may include openings formed through walls of the enclosed chamber 20A and may be located at substantially opposite ends of the enclosed chamber 20A, and/or opposite ends of the composite reinforcement material 12A, from each other.

The enclosed chamber 20A may include the rigid tooling 38A and the impermeable membrane 40A, such as a vacuum bag, sealed to the rigid tooling 38A, forming a periphery around the composite reinforcement material 12A placed on the rigid tooling 38A. The impermeable membrane 40A may have a pleat or pocket integrally formed therein and configured to serve as the resin reservoir 18A at one end or peripheral edge of the impermeable membrane 40A. The pleat or pocket may hang off of one end of the rigid tooling 38A, such that the resin 14A therein gathers at a bottom of the pleat or pocket opposite of the opening of the resin reservoir 18A where the viscosity valve 16A is located. This configuration allows air to be suctioned out of the resin reservoir 18A by vacuum before any of the resin 14A passes through the viscosity valve 16A and contacts the composite reinforcement material 12A.

A portion of the impermeable membrane 40A integral with and extending between the resin reservoir 18A and the enclosed chamber 20A may be considered part of the viscosity valve 16A or an opening of the viscosity valve 16A bounded on either side by two portions of the coil 30A of the viscosity valve 16A. Specifically, the coil 30A may contact an outer surface of the impermeable membrane 40A and may wrap around a section of the impermeable membrane 40A or two portions of the coil 30A may line opposing sides of the opening between the resin reservoir 18A and the enclosed chamber 20A. The flow media 36A extending through the viscosity valve 16A may also extend at least partially into the resin reservoir 18A and/or into the enclosed chamber 20A between the impermeable membrane 40A and the rigid tooling 38A.

The vacuum port 22A may be located at an opposite end of the composite reinforcement material 12A from the viscosity valve 16A and may fluidly couple with the enclosed chamber 20A, such that the vacuum source 24A may pull atmosphere and/or resin 14A from the enclosed chamber 20A and/or the resin reservoir 18A via the vacuum port 22A. The vacuum port 22A may comprise any opening through which air, atmosphere, or resin 14A may pass from the enclosed chamber 20A to the vacuum source 24A. As illustrated in FIG. 1, the vacuum port 22A may be formed through the impermeable membrane 40A or formed through the rigid tooling 38A at or proximate to an end or edge of the impermeable membrane 40A opposite of the resin reservoir 18A.

The vacuum source 24A may be a vacuum pump or any device configured to evacuate air or atmosphere from within the enclosed chamber 20A and/or from the resin reservoir 18A via the vacuum port 22A and/or the viscosity valve 16A. Any amount of vacuum required for pulling the resin 14A, at a particular temperature and/or viscosity, may be applied by the vacuum source 24A without departing from the scope of the invention.

In use, the composite reinforcement material 12A may be placed in the enclosed chamber 20A. For example, the composite reinforcement material 12A may be placed on the rigid tooling 38A and sealed under the impermeable membrane 40A, such that the rigid tooling 38A and the impermeable membrane 40A cooperatively form the enclosed chamber 20A. The space within the enclosed chamber 20A may be fluidly coupled with the resin reservoir 18A and the vacuum source 24A via the viscosity valve 16 and the vacuum port 22A, respectively. The rigid tooling 38A, the impermeable membrane 40A, and the composite reinforcement material 12A encased therein may be placed in the oven 32A, autoclave, or other heated chamber. This may naturally heat up and lower the viscosity of the resin 14A in the resin reservoir 18A (i.e., the pleat or pocket of the impermeable membrane 40A).

Then, the vacuum source 24A may be actuated to evacuate air from within the enclosed chamber 20A. For example, the vacuum source 24A may evacuate air from between the impermeable membrane 40A and the rigid tooling 38A, such that the impermeable membrane is pulled down against the composite reinforcement material 12A and/or the flow media 36A and compresses the composite reinforcement material 12A against the rigid tooling 38A. Though the resin 14A in the resin reservoir 18A may be heated within the oven 32A, if the coil 30A of the viscosity valve 16A is in its cooled state, the resin 14A flowing out of the resin reservoir 18A through the viscosity valve 16A may become more viscous and form a sort of dam within the viscosity valve 16A between the resin reservoir 18A and the enclosed chamber 20A, preventing any resin 14A from flowing to the composite reinforcement material 12A. The viscosity valve 16A may be in this closed position in its relatively cooled state when the vacuum source 24A is initially actuated on.

However, once the viscosity valve 16A is actuated to the open position, it may be warmed to a relatively heated state, thereby lowering the viscosity of the resin 14A contacting or in near proximity to the viscosity valve 16A. When the viscosity valve 16A is actuated to the open position and the vacuum source 24A is actuated on, the resin 14A may freely flow from the resin reservoir 18A to the enclosed chamber 20A and the composite reinforcement material 12A therein, as the resin 14A is pulled by the vacuum source 24A toward the vacuum port 22A. This vacuum may continue to pull the resin 14A through the composite reinforcement material 12A in the enclosed chamber 20A as long as the resin 14A has a low enough viscosity. If an operator wishes to control how much of the resin 14A enters the enclosed chamber 20A, the operator may actuate the viscosity valve 16A back to the closed position, raising the viscosity of the resin 14A in and proximate to the viscosity valve 16A and thereby damming up the viscosity valve 16A so that resin may not flow therethrough.

Embodiment 2

Pleat, Single-Sided Viscosity Valve, Insulation

A resin flow-controlling apparatus 10B constructed in accordance with a second exemplary embodiment of the invention is illustrated in FIG. 4. The resin flow-controlling apparatus 10B may include many of the same components as the resin flow-controlling apparatus 10A. Specifically, the resin flow-controlling apparatus 10B may comprise at least one viscosity valve 16B, at least one resin reservoir 18B fluidly coupled with the viscosity valve 16B, an enclosed chamber 20B, a vacuum port 22B, a vacuum source 24B, and/or a flow media 36A. The enclosed chamber 20B may be configured for housing therein composite reinforcement material 12B to be infused with resin 14B. The enclosed chamber 20B may include a rigid tooling 38B and an impermeable membrane 40B sealed to the rigid tooling 38B, each constructed and sealed to each other with an airtight seal 42B, as in the first exemplary embodiment illustrated in FIG. 1 and described above, thereby forming a periphery around the composite reinforcement material 12B placed on the rigid tooling 38B. The viscosity valve 16B may comprise a coil 30B configured similar to the coil 30A described above. The viscosity valve 16B may also comprise any of the viscosity valve 16A components illustrated in FIGS. 2 and 3 and described above in the first exemplary embodiment of the invention.

However, instead of the coil 30A of the viscosity valve 16A being wrapped around the outer surface of the impermeable membrane 40A, the coil 30B resides in a coil channel 44B formed into the rigid tooling 38B inward of the airtight seal 42B sealing the impermeable membrane 40B and the rigid tooling 38B. The coil channel 44B may have thermal insulation 26B therein for thermally isolating the coil 30B from the rigid tooling 38B. An outer surface of the impermeable membrane 40B opposite of the coil 30B within the coil channel 44B may also have insulation 26B positioned thereon as a barrier to prevent heat from being transferred between an oven or autoclave in which the enclosed chamber 20B resides and the outer surface of the impermeable membrane 40B at the viscosity valve 16B. Thus, only the state of the coil 30B in the coil channel 44B may affect the flow of resin 14B between the coil 30B and the insulation 26B of the viscosity valve 16B. This embodiment may require less coil material than in the first embodiment of the invention, since one side of the viscosity valve 16B is regulated by the insulation 26B. Furthermore, this embodiment of the invention may allow the coil channel 44B to be integrated into the rigid tooling 38B so that the coil 30B does not need to be attached thereto for each infusion cycle, but may rather be a permanent feature of the rigid tooling 38B.

Embodiment 3

Integral Resin Reservoir

Figure 5:
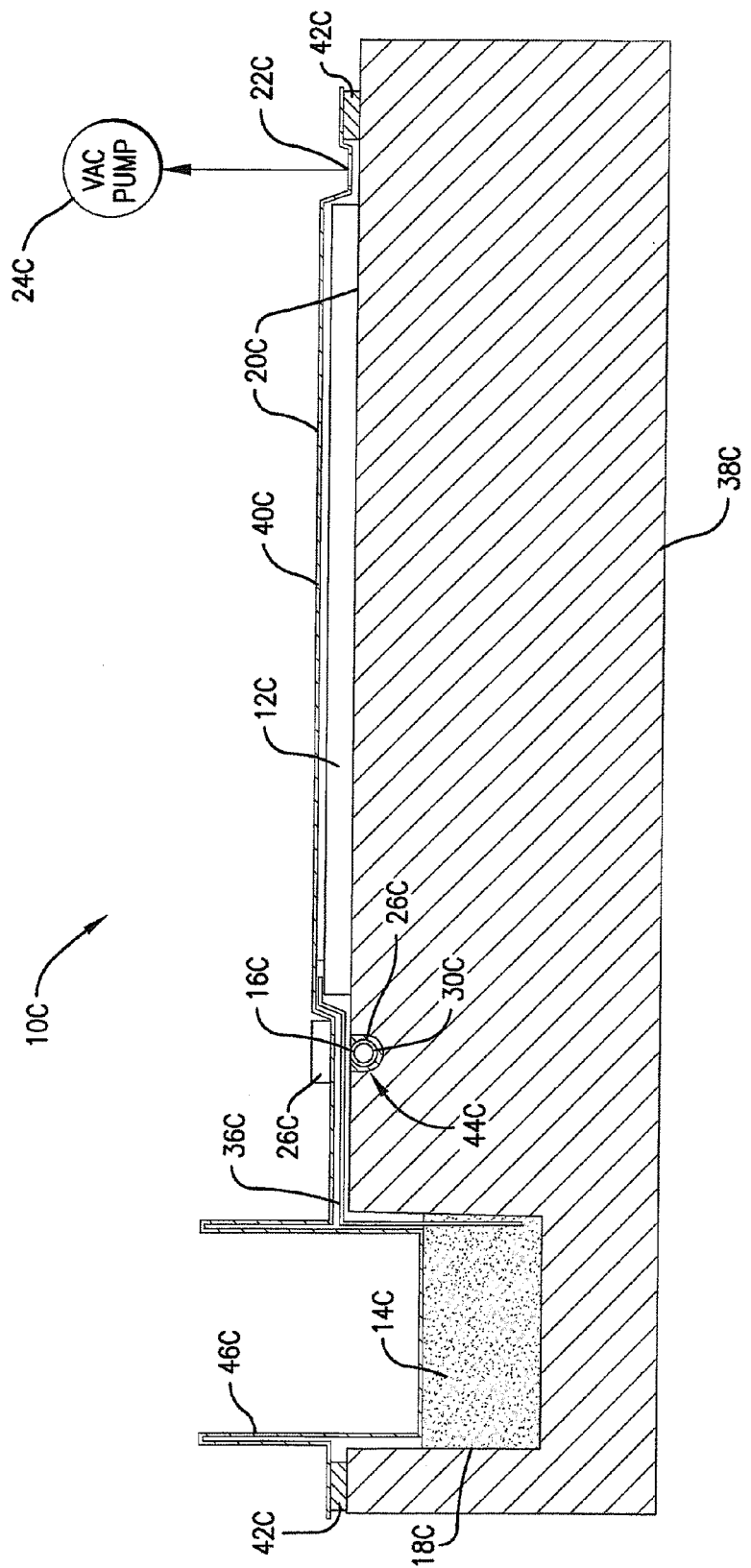
FIG. 5 is a vertical cross-sectional view of a resin flow control apparatus constructed in accordance with a third embodiment of the present invention.

A resin flow-controlling apparatus 10C constructed in accordance with a third exemplary embodiment of the invention is illustrated in FIG. 5. The resin flow-controlling apparatus 10C may include many of the same components as the resin flow-controlling apparatus 10A of the first exemplary embodiment illustrated in FIGS. 1-3 or the resin flow-controlling apparatus 10B of the second exemplary embodiment illustrated in FIG. 4. Specifically, the resin flow-controlling apparatus 10C may comprise at least one viscosity valve 16C, at least one resin reservoir 18C fluidly coupled with the viscosity valve 16C, an enclosed chamber 20C, a vacuum port 22C, a vacuum source 24C, and/or a flow media 36C. The enclosed chamber 20C may be configured for housing therein composite reinforcement material 12C to be infused with resin 14C. The enclosed chamber 20C may include a rigid tooling 38C and an impermeable membrane 40C sealed to the rigid tooling 38C, each constructed and sealed to each other with an airtight seal 42C, as in the first exemplary embodiment illustrated in FIG. 1 and described above, thereby forming a periphery around the composite reinforcement material 12C placed on the rigid tooling 38C. The viscosity valve 16C may comprise a coil 30C configured similar to the coil 30B described above in the second embodiment of the invention. Specifically, as in the second embodiment of the invention, the resin flow-controlling apparatus 10C may comprise insulation 26C thermally isolating the viscosity valve 16C and a coil channel 44C in which the coil 30C is placed. The viscosity valve 16C may also comprise any of the viscosity valve 16A components illustrated in FIGS. 2 and 3 and described above in the first exemplary embodiment of the invention.

However, instead of the resin reservoir being integrally formed into the impermeable membrane, as in the first and second exemplary embodiments described above, the resin reservoir 18C is an indention or channel integrally formed or molded into the rigid tooling 38C. Furthermore, a portion of the impermeable membrane 40C is formed with an area of excess material 46C, such as the two pleats illustrated in FIG. 5, and is configured to be placed directly over the resin reservoir 18C, such that when vacuum is drawn, the area of excess material 46C is pulled toward and against the resin 14C in the resin reservoir 18C. This area of excess material 46C under vacuum assists in pushing or squeezing the resin 14C upward or otherwise out of the resin reservoir 18C through the viscosity valve 16C when the viscosity valve 16C is in the open position and/or heated state. As in the second exemplary embodiment of the invention, the coil 30C of the viscosity valve 16C may be positioned in the coil channel 44C formed into the rigid tooling 38C and the insulation 26C may be positioned on an opposite side of the viscosity valve 16C, outward of the impermeable membrane 40C to prevent heat from being transferred between an oven or autoclave in which the enclosed chamber 20C resides and the outer surface of the impermeable membrane 40C at the viscosity valve 16C location. The impermeable membrane 40C may be sealed to the rigid tooling 38C around a periphery thereof which encompasses the resin reservoir 18C formed into the rigid tooling 38C and the coil channel 44C located between the resin reservoir 18C and the composite reinforcement material 12C. The vacuum port 22C, as in the other exemplary embodiments, may be formed through the impermeable membrane 40C and/or the rigid tooling 38C at a location inward of the airtight seal 42C.

Embodiment 4

Plurality of Pleats and Valves

Figure 6:
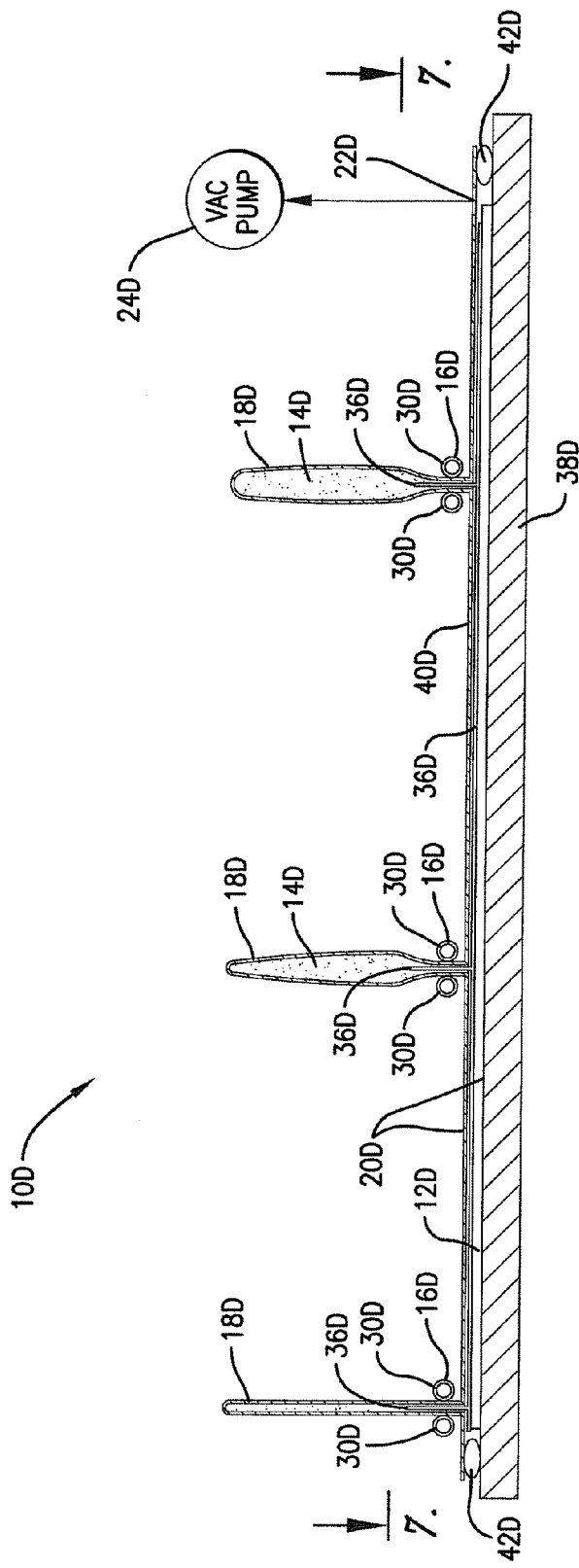
FIG. 6 is a vertical cross-sectional view of a resin flow control apparatus constructed in accordance with a fourth embodiment of the present invention.
Figure 7:
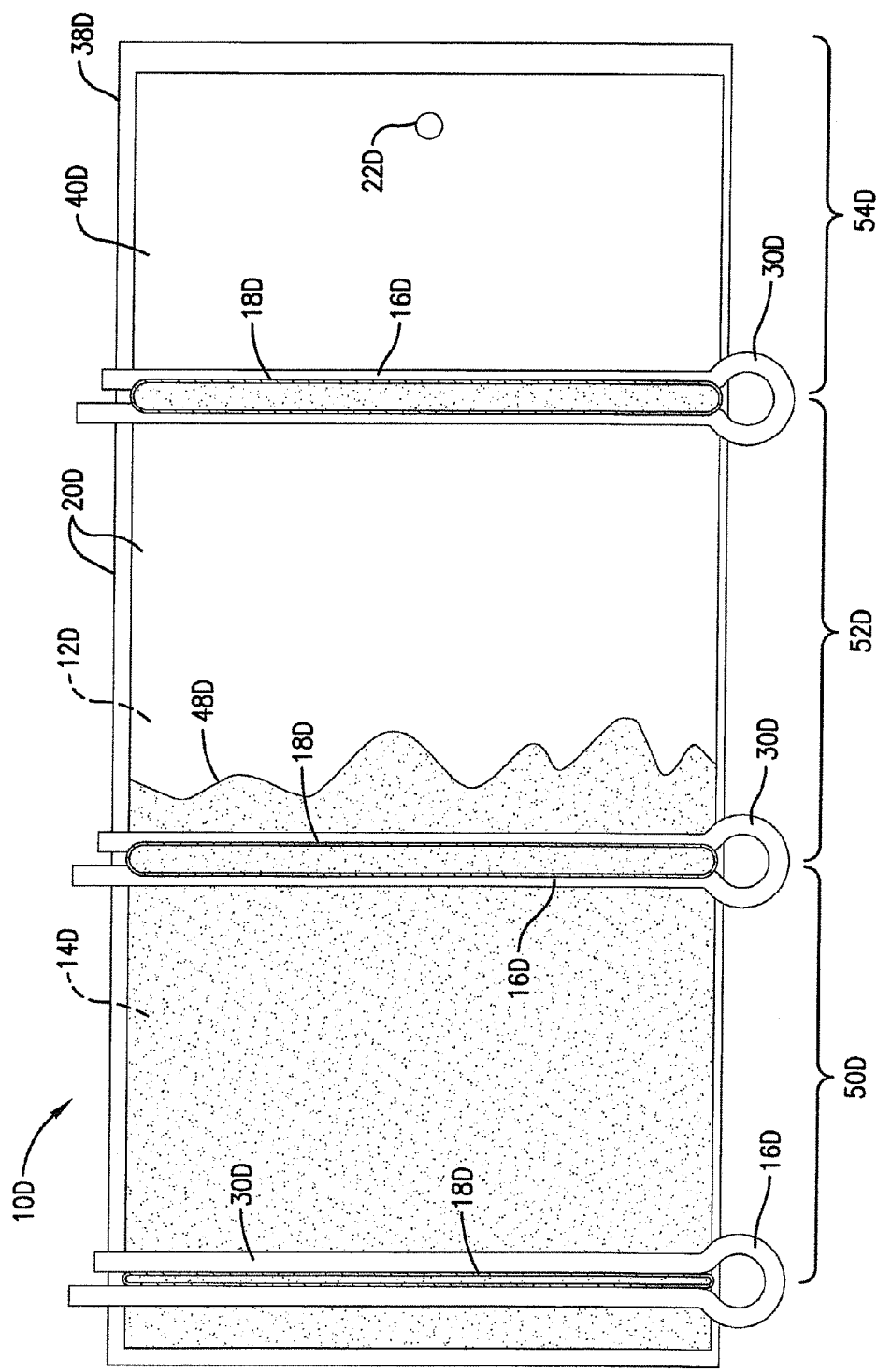
FIG. 7 is a horizontal cross-sectional view of the resin flow control apparatus of FIG. 6, taken along lines 7-7 of FIG. 6.

A resin flow-controlling apparatus 10D constructed in accordance with a fourth exemplary embodiment of the invention is illustrated in FIGS. 6 and 7. The resin flow-controlling apparatus 10D may include many of the same components as the resin flow-controlling apparatus 10A of the first exemplary embodiment illustrated in FIGS. 1-3. Specifically, the resin flow-controlling apparatus 10D may comprise at least one viscosity valve 16D, at least one resin reservoir 18D fluidly coupled with the viscosity valve 16D, an enclosed chamber 20D, a vacuum port 22D, a vacuum source 24D, and/or a flow media 36D. The enclosed chamber 20D may be configured for housing therein composite reinforcement material 12D to be infused with resin 14D. The enclosed chamber 20D may include a rigid tooling 38D and an impermeable membrane 40D sealed to the rigid tooling 38D, each constructed and sealed to each other with an airtight seal 42D, as in the first exemplary embodiment illustrated in FIG. 1 and described above, thereby forming a periphery around the composite reinforcement material 12D placed on the rigid tooling 38D. The viscosity valve 16D may comprise a coil 30D configured similar to the coil 30A described above. The viscosity valve 16D may also comprise any of the viscosity valve 16A components illustrated in FIGS. 2 and 3 and described above in the first exemplary embodiment of the invention.

The at least one resin reservoir 18D includes a plurality of resin reservoirs 18D spaced apart from each other length-wise down a length of the composite reinforcement material 12D and each of the resin reservoirs 18D may have a length extending across a width of the composite reinforcement material 12D. Each of the resin reservoirs 18D may be pleats or pockets integrally formed with the impermeable membrane 40D containing resin 14D therein. Furthermore, in the fourth embodiment of the invention, the at least one viscosity valve 16D comprises a plurality of viscosity valves 16D. The flow of resin 14D from each of the plurality of resin reservoirs 18D may therefore be controlled by one of the plurality of viscosity valves 16D. Specifically, as illustrated in FIGS. 6-7, the viscosity valves 16D may each include the two-sided coil configuration of the first exemplary embodiment of the invention illustrated in FIG. 1. Each of the viscosity valves 16D may also have the flow media 36D sandwiched therebetween and extending through to their respective resin reservoirs 18D and/or into the enclosed chamber 20D formed between the impermeable membrane 40D and the rigid tooling 38D. For example, as illustrated in FIG. 6, the flow media 36D may extend substantially continuously throughout the enclosed chamber 20D between the impermeable membrane 40D and the composite reinforcement material 12D, as well as through each of the viscosity valves 16D and partially into each of the resin reservoirs 18D. However, any of the invention embodiments described herein may have flow media placed in this manner to extend throughout the enclosed chamber and through the viscosity valves.

The viscosity valves 16D may be opened and closed in sequence such that one zone of the composite reinforcement material 12D is infused with resin 14D prior to a subsequent adjacent zone of composite reinforcement material 14 being infused with resin 14D. For example, FIG. 7 illustrates a resin flow front 48D moving toward the vacuum port 22D with a first one of the coils 30D in the cooled state, having already been opened and then closed again, such that a first zone 50D of the composite reinforcement material 12D is completely infused with the resin 14D. Meanwhile, a second one of the coils 30D is in the heated, open state allowing resin 14D to flow through its corresponding resin reservoir 18D, thus beginning the process of infusing a second zone 52D of the composite reinforcement material 12D with the resin 14D. A third one of the coils 30D is illustrated in the cooled state and may be warmed to the heated, open state once the resin flow front 48D reaches an end of the second zone 52D. Heating the third one of the coils 30D then allows a third zone 54D of the composite reinforcement material 12D to be infused with resin 14D.

Embodiment 5

Viscosity Valve for Resin Transfer Molding

Figure 8:
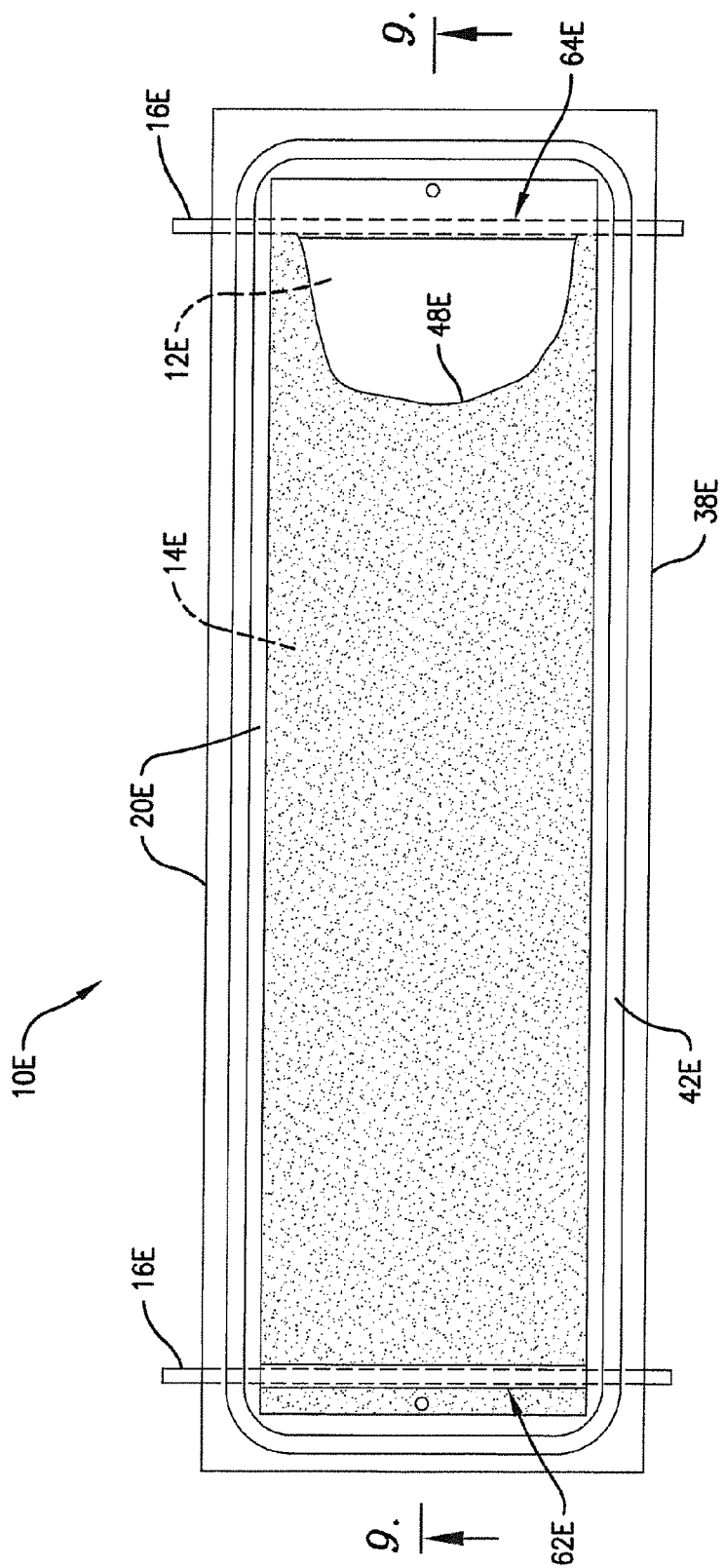
FIG. 8 is a plan view of a resin flow control apparatus constructed in accordance with a fifth embodiment of the present invention.
Figure 9:
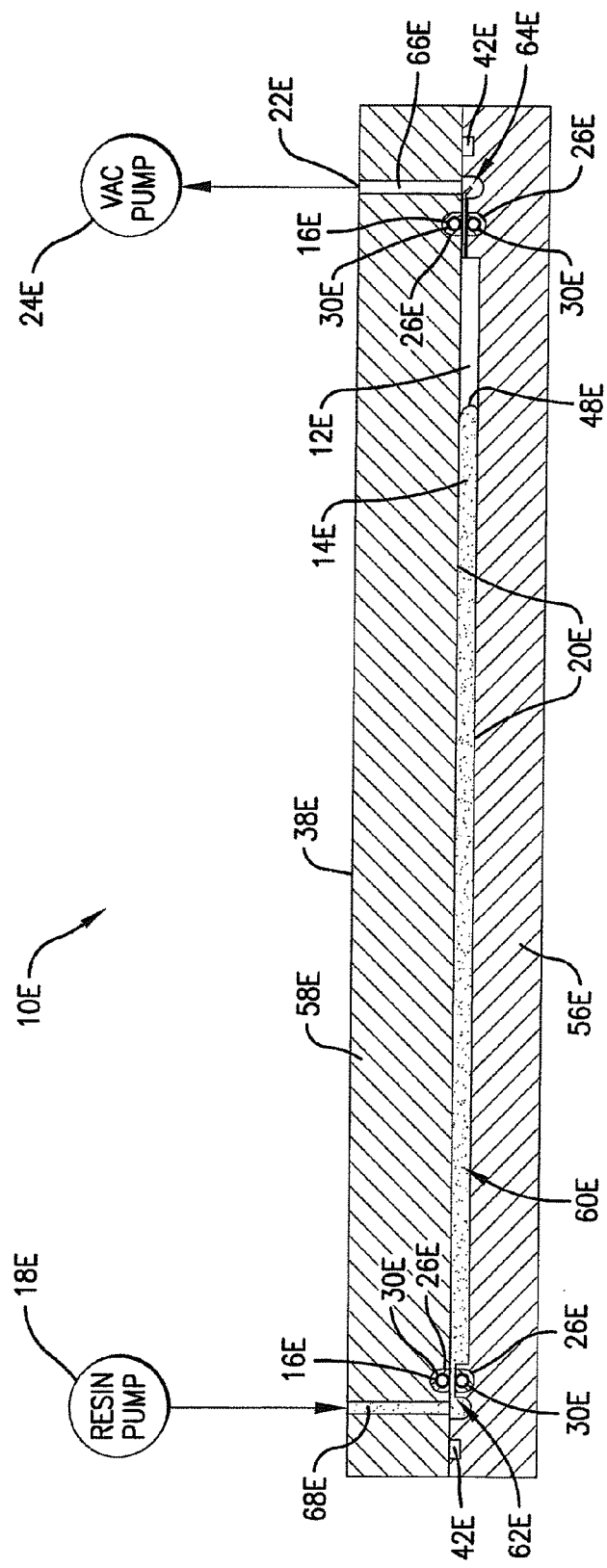
FIG. 9 is a vertical cross-sectional view of the resin flow control apparatus of FIG. 8, taken along lines 9-9 of FIG. 8.

A resin flow-controlling apparatus 10E constructed in accordance with a fifth exemplary embodiment of the invention is illustrated in FIGS. 8 and 9. The resin flow-controlling apparatus 10E may include many of the same components as the resin flow-controlling apparatuses 10A-10D of the first, second, third, and fourth embodiments of the invention described above. Specifically, the resin flow-controlling apparatus 10E may comprise at least one viscosity valve 16E, at least one resin reservoir 18E fluidly coupled with the viscosity valve 16E, an enclosed chamber 20E, a vacuum port 22E, and/or a vacuum source 24E. The enclosed chamber 20E may be configured for housing therein composite reinforcement material 12E to be infused with resin 14E. The enclosed chamber 20E may include a rigid tooling 38E and/or an airtight seal 42E. The viscosity valve 16E may comprise at least one coil 30E configured similar to the coil 30B and the coil 30C described above and embedded in at least one coil channel 44E. The coil 30E may be separated from the rigid tooling 38E via insulation 26E. The viscosity valve 16E may also comprise any of the viscosity valve 16A components illustrated in FIGS. 2 and 3 and described above in the first exemplary embodiment of the invention.

However, the impermeable membranes of the previous embodiments may be omitted and the rigid tooling 38E having a first part 56E and a second part 58E, with at least one of these parts 56E,58E having at least one cavity 60E molded or otherwise formed therein to form a hollow space of the enclosed chamber 20E. In this embodiment of the invention, a plurality of the coils 30E and the coil channels 44E may cooperatively form the viscosity valves 16E. At least one of the coil channels 44E may be located in one of the parts 56E,58E of the rigid tooling 38E and may be positioned to rest proximate to at least one of the coil channels 44E in another of the parts 56E,58E of the rigid tooling 38E when the parts 56E,58E are brought together to cooperatively form the enclosed chamber 20E. The coils 30E resting in these pairs of coil channels 44E may each cooperatively form one of the viscosity valves 16E. The coil channels 44E may be lined with the thermal insulation 26E for inhibiting heat transfer between the rigid tooling 38E and the coils 30E.

In some embodiments of the invention, when the two parts 56E,58E of the rigid tooling 38E are joined to form the enclosed chamber 30E, two of the coils 30E at a first end 62E of the cavity 60E may be slightly spaced apart from each other such that air and resin 14E may flow therebetween from the resin reservoir 18E, and two of the coils 30E at a second end 64E of the cavity 60E may be slightly spaced apart from each other such that air and resin 14E may flow therebetween and out through a vent tube 66E. The vent tube 66E may be formed through the first and/or second part 56E,58E of the rigid tooling 38E and may serve as the vacuum port 22E or merely a vent to atmosphere outward of the enclosed chamber 20E. Likewise, the resin reservoir 18E may be fluidly coupled with the viscosity valve 16E at the first end 62E of the cavity 60E by a resin tube 68E. The resin tube 68E may be formed through the first and/or second part 56E,58E of the rigid tooling 38E. In some embodiments of the invention, as illustrated in FIG. 9, the resin reservoir 18E may be or may comprise a resin pump configured to pump air and/or resin 14E through the resin tube 68E and through the viscosity valve 16E (when open) at the first end 62E of the cavity 60E. In the fifth exemplary embodiment of the invention, resin flow may be facilitated by the resin pump and/or the vacuum source 24E without departing from the scope of the invention.

For resin transfer molding, one advantage of this fifth exemplary embodiment of the invention is that the viscosity valve 16E at the first end 62E of the cavity 60E may be in the open position (i.e., heated) to allow resin 14E to flow into the cavity 60E and through the composite reinforcement material 12E therein while the viscosity valve 16E at the second end 64E of the cavity 60E may be closed (i.e., cooled). However, the closed viscosity valve 16E at the second end 64E still allows air to flow therethrough, even when "closed," such that resin flow may be arrested at the viscosity valve 16E at the second end 64E without preventing air flow from the cavity 60E to vent. This configuration may allow for a uniform distribution of the resin 14E throughout the composite reinforcement material 12E even when the resin flow front 48E propagates non-uniformly through the composite reinforcement material 12E due to edge or preform permeability variations.

Embodiment 6

Intermediate Viscosity Valve for Resin Transfer Molding

Figure 10:
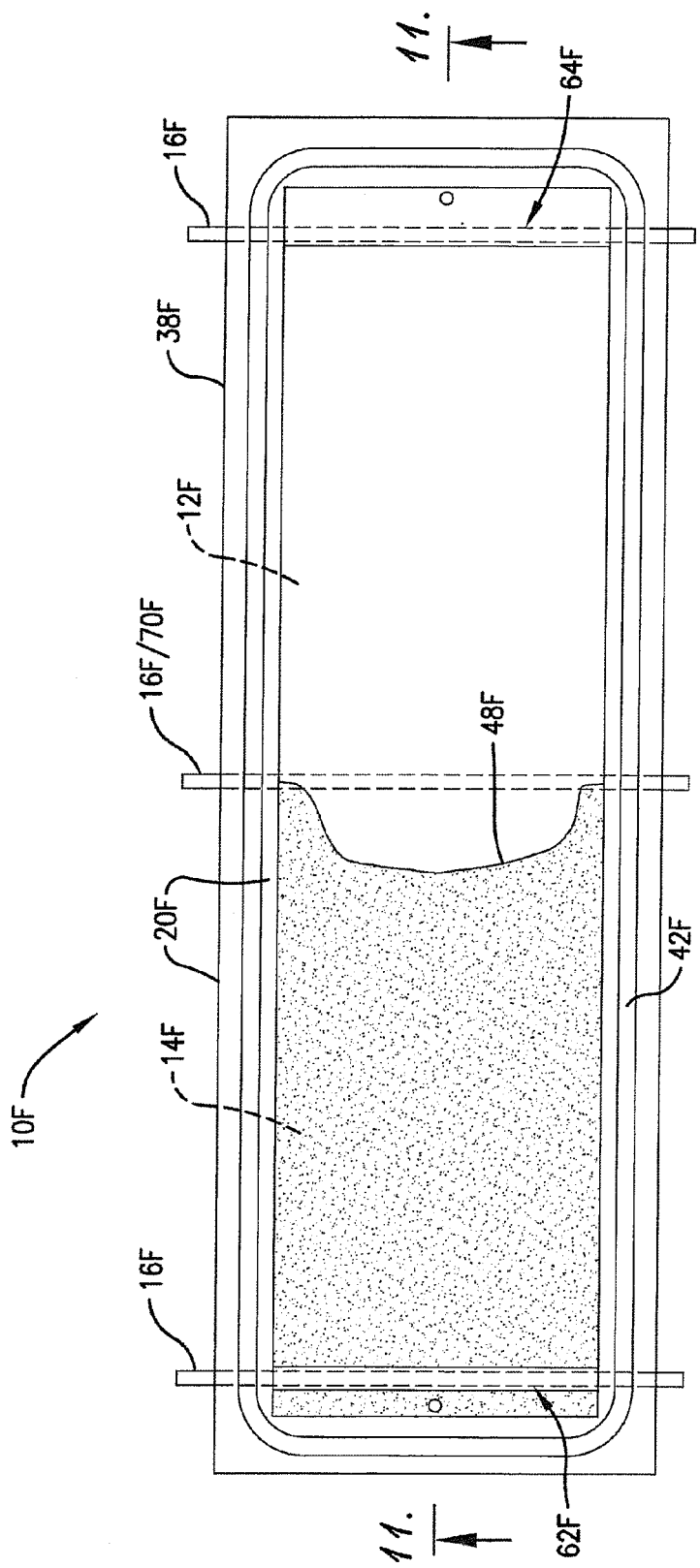
FIG. 10 is a plan view of a resin flow control apparatus constructed in accordance with a sixth embodiment of the present invention.
Figure 11:
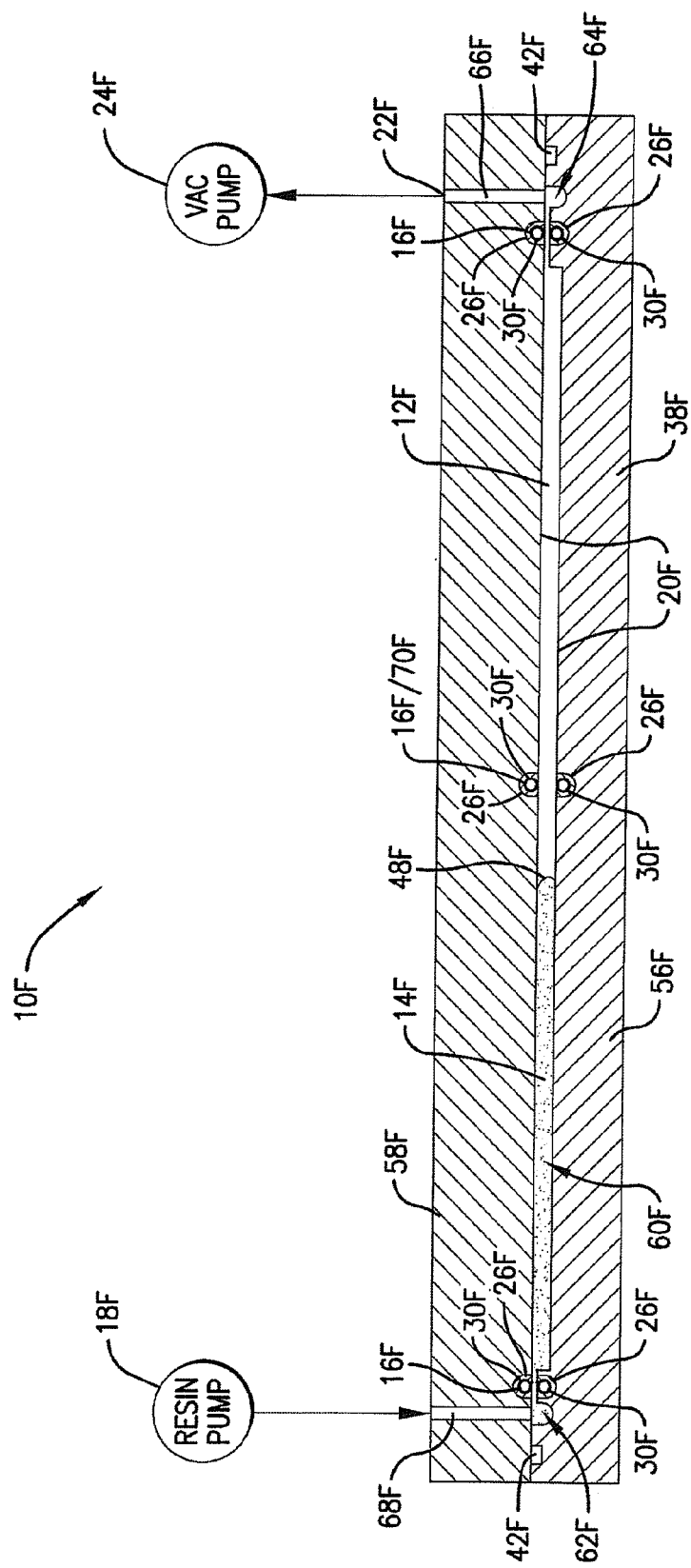
FIG. 11 is a vertical cross-sectional view of the resin flow control apparatus of FIG. 10, taken along lines 11-11 of FIG. 10.

A resin flow-controlling apparatus 10F constructed in accordance with a sixth exemplary embodiment of the invention is illustrated in FIGS. 10 and 11. The resin flow-controlling apparatus 10F may include many of the same components as the resin flow-controlling apparatuses 10A-10E of the first, second, third, fourth, and fifth embodiments of the invention described above. Specifically, the resin flow-controlling apparatus 10F may comprise at least one viscosity valve 16F, at least one resin reservoir 18F fluidly coupled with the viscosity valve 16F, an enclosed chamber 20F, a vacuum port 22F, and/or a vacuum source 24F. The enclosed chamber 20F may be configured for housing therein composite reinforcement material 12F to be infused with resin 14F. The enclosed chamber 20F may include a rigid tooling 38F and/or an airtight seal 42F. The viscosity valve 16F may comprise at least one coil 30F configured similar to the coil 30B and the coil 30C described above and embedded in at least one coil channel 44F. The coil 30F may be separated from the rigid tooling 38F via insulation 26F. The viscosity valve 16F may also comprise any of the viscosity valve 16A components illustrated in FIGS. 2 and 3 and described above in the first exemplary embodiment of the invention.

As in the fifth embodiment described above, the enclosed chamber 20F of the sixth embodiment illustrated in FIGS. 10 and 11 may include a two-part rigid tooling 38F, including a first part 56F and a second part 58F, with at least one of these parts 56F,58F having at least one cavity 60F molded or otherwise formed therein to form a hollow space of the enclosed chamber 20F. However, in the sixth exemplary embodiment of the invention, an intermediate viscosity valve 70F may be included between the viscosity valves 16F at first and second ends 62F,64F of the cavity 60F. As with the other viscosity valves 16F, this intermediate viscosity valve 70F may comprise two coils 30F resting in coil channels 44F formed into opposing surfaces of the parts 56F,58F of the rigid tooling 38F within the enclosed chamber 20F. The composite reinforcement material 12F may rest between the two coils 30F of the intermediate viscosity valve 70F. The intermediate viscosity valve 70F may be used to control resin 14F flowing between two regions of the composite reinforcement material 12F. For example, the viscosity valve 16F at the first end 62F of the cavity 60F may be in an open position (i.e., heated) allowing resin 14F to flow therethrough while the intermediate viscosity valve 70F is in a closed position (i.e., cooled) such that air may pass therethrough, but not resin 14F. This may allow a resin flow front 48F to be stabilized before being reheated and released into a next region of the composite reinforcement material 12F. Ideally, resin 14F should flow evenly across the composite reinforcement material 12F. However, placement of the intermediate viscosity valve 70F or a plurality of intermediate viscosity valves along a length of the cavity 60F may assist in evening out the resin flow where needed. The intermediate viscosity valve 70F or valves may be positioned anywhere along the cavity 60F and may be particularly desirable at locations where permeability variations destabilize the resin flow front 48F.

Note that one or more intermediate viscosity valves may be used to control a resin flow front in prior art resin-infusion systems as well. For example, a standard system using traditional tubes, valves, and heat-tracing elements to deliver resin to the composite reinforcement material may be used to deliver the resin to the enclosed chamber. However, this standard system may be outfitted with intermediate viscosity valves, such as the intermediate viscosity valve described above. The intermediate viscosity valves may be incorporated into or placed along the enclosed chamber at various locations between a resin reservoir (or a resin pleat in the impermeable membrane) and a vacuum port. The intermediate viscosity valves may be actuated to a heated state (open) or a cooled state (closed) at desired time intervals to allow various segments of the composite reinforcement material to be fully infused with resin before allowing the resin to pass through to a subsequent segment of the composite reinforcement material.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of infusing composite reinforcement material with resin, the method comprising:
   placing the composite reinforcement material within an enclosed chamber having opposed first and second openings, wherein the first opening is fluidly coupled with a resin reservoir containing resin therein and a viscosity valve is located between the resin reservoir and the enclosed chamber, wherein the viscosity valve is configured to selectively alternate between a heated state in which the viscosity valve is open and a cooled state in which the viscosity valve is closed while in a heated oven or autoclave;
   heating the composite reinforcement material and enclosed chamber in the heated oven or autoclave while the viscosity valve is closed in the cooled state;
   forcing the resin from the resin reservoir toward the first opening; and
   switching the viscosity valve from the cooled state to the heated state, thereby heating the viscosity valve to a temperature sufficient to lower the viscosity of the resin such that the resin is fluid enough to flow through the viscosity valve from the resin reservoir and through the composite reinforcement material toward the second opening.

2. The method of claim 1, further comprising switching the viscosity valve from the heated state back to the cooled state to a temperature sufficient to raise the viscosity of the resin such that the resin is too thick to flow past the viscosity valve at the first opening into the enclosed chamber while the composite reinforcement material remains heated in the oven or autoclave.

3. The method of claim 1, further comprising coupling the enclosed chamber with a plurality of viscosity valves, each spaced apart from each other along a length of the enclosed chamber and individually fluidly coupled with at least one resin reservoir, and heating and cooling the viscosity valves in a sequence such that different zones of the composite reinforcement material are infused with resin from one or more of the resin reservoirs at different times.

4. The method of claim 1, wherein the enclosed chamber comprises a rigid tooling and an impermeable membrane sealed to the rigid tooling around a periphery of the composite reinforcement material.

5. The method of claim 4, wherein the resin reservoir is a compartment integrally formed into the impermeable membrane and the viscosity valve is a heatable and coolable element configured for transferring heat with resin flowing through the first opening.

6. The method of claim 1, wherein the viscosity valve comprises at least one pipe or coil, and the method further comprises selectively heating the at least one pipe or coil and selectively cooling the at least one pipe or coil by forcing heated or cooled gas or liquid through the at least one pipe or coil, while the composite reinforcement material is heated and cured.

7. The method of claim 6, wherein the viscosity valve further comprises a venturi vacuum configured to pull heat from the autoclave or oven into the pipe or coil.

8. The method of claim 6, wherein the viscosity valve further comprises insulation positioned for thermally isolating at least a portion of an outer surface of the pipe or coil from the autoclave or oven such that the pipe or coil can be selectively cooled while the composite reinforcement material is being heated and cured in the autoclave or oven.

9. The method of claim 1, wherein the forcing step comprises drawing vacuum from the second opening to force the resin from the resin reservoir toward the first opening.

10. The method of claim 1, wherein a majority of the resin reservoir hangs lower than an elevation of the first opening.

11. The method of claim 1, wherein the enclosed chamber comprises multiple parts of a rigid tooling cooperatively forming a cavity in which the composite reinforcement material is placed for resin transfer molding, wherein the first opening is formed through at least one of the multiple parts and the second opening is formed through at least one of the multiple parts.

12. The method of claim 11, further comprising a plurality of viscosity valves configured for selectively heating and cooling resin positioned at or proximate to the first opening and the second opening.

13. The method of claim 1, further comprising actuating at least one intermediate viscosity valve located between the first and second openings of the enclosed chamber in such a manner as to allow or prevent resin flow between a first portion and a second portion of the enclosed chamber.

14. A method of infusing composite reinforcement material with resin, the method comprising:
placing the composite reinforcement material within an enclosed chamber having opposed first and second openings, wherein the first opening is fluidly coupled with a resin reservoir containing resin therein and a viscosity valve is located between the resin reservoir and the enclosed chamber, wherein the viscosity valve comprises at least one pipe or coil configured to selectively alternate between being fluidly coupled with a heat source and fluidly coupled with a cooling source;
forcing the resin from the resin reservoir toward the first opening;
heating the viscosity valve to a temperature sufficient to lower a viscosity of the resin such that the resin is fluid enough to flow through the viscosity valve from the resin reservoir and through the composite reinforcement material toward the second opening, wherein heating the viscosity valve comprises fluidly coupling the at least one pipe or coil with the heat source; and
cooling the viscosity valve to a temperature sufficient to raise the viscosity of the resin such that the resin is too thick to flow past the viscosity valve at the first opening into the enclosed chamber, wherein cooling the viscosity valve comprises fluidly coupling the at least one pipe or coil with the cooling source.

15. The method of claim 14, further comprising coupling the enclosed chamber with a plurality of viscosity valves, each spaced apart from each other along a length of the enclosed chamber and individually fluidly coupled with at least one resin reservoir, and heating and cooling the viscosity valves in a sequence such that different zones of the composite reinforcement material are infused with resin from one or more of the resin reservoirs at different times.

16. The method of claim 14, wherein the heat source is an autoclave or oven in which the composite reinforcement material is cured and the cooling source is a cooled or compressed gas or fluid source.

17. The method of claim 14, wherein the forcing step comprises at least one of drawing vacuum from the second opening to force the resin from the resin reservoir toward the first opening and forcing resin toward the first opening with a resin pump.

18. The method of claim 14, further comprising actuating at least one intermediate viscosity valve located between the first and second openings of the enclosed chamber in such a manner as to allow or prevent resin flow between a first portion and a second portion of the enclosed chamber.

19. A method of infusing composite reinforcement material with resin, the method comprising:
placing the composite reinforcement material within an enclosed chamber having opposed first and second openings, wherein the first opening is fluidly coupled with a resin reservoir containing resin therein and a viscosity valve is located between the resin reservoir and the enclosed chamber, wherein the viscosity valve comprises at least one pipe or coil;
forcing the resin from the resin reservoir toward the first opening; and
selectively heating the at least one pipe or coil by fluidly coupling a venturi vacuum to a compressed gas source and pulling heat from an autoclave or oven into the pipe or coil, thereby heating the viscosity valve to a temperature sufficient to lower the viscosity of the resin such that the resin is fluid enough to flow through the viscosity valve from the resin reservoir and through the composite reinforcement material toward the second opening.

* * * * *